United States Patent [19]

Packman

[11] 3,999,356
[45] Dec. 28, 1976

[54] PANEL EDGE FASTENER CLIP

[75] Inventor: Robert S. Packman, Carmel, Ind.

[73] Assignee: RCA Corporation, New York, N.Y.

[22] Filed: Sept. 29, 1975

[21] Appl. No.: 617,800

[52] U.S. Cl. .............................. 403/282; 52/497; 52/760

[51] Int. Cl.² .......................................... F16B 7/04

[58] Field of Search ......... 52/753 C, 753 D, 753 R, 52/753 E, 760, 285, 495, 496, 497; 85/83, 85, 81, 11, 13, 23; 403/243, 263, 371, 372

[56] References Cited

UNITED STATES PATENTS

| 2,503,854 | 4/1950 | Trainor | 52/753 C |
| 3,202,038 | 8/1965 | Bass | 85/83 |
| 3,417,525 | 12/1968 | Dashio | 85/83 X |
| 3,512,222 | 5/1970 | Tinnerman | 52/760 X |
| 3,848,388 | 11/1974 | Brétché | 52/753 D |

FOREIGN PATENTS OR APPLICATIONS

| 701,524 | 2/1966 | Italy | 85/85 |

Primary Examiner—Wayne L. Shedd
Attorney, Agent, or Firm—Eugene M. Whitacre; Peter M. Emanuel

[57] ABSTRACT

A joint assembly of a television cabinet or similar structure is formed by inserting a panel member in a groove formed in a receiving member. A fastener clip, inserted in the groove, engages both the panel member and the receiving member and holds them together. The fastener includes a generally planar body portion arranged to abut a sidewall of the groove. The fastener has at least one deformable section generally directed at an angle to the body portion toward the interior of the groove and flexibly affixed to the body to oppose motion toward the body portion. Each deformable section includes at least a first biting projection extending in a direction generally toward the interior of the groove. Each deformable section also includes at least a second biting projection extending in a direction generally opposite to the direction of the first biting projection. The thickness of the panel member is approximately equal to but slightly less than the width of the groove so that when a panel member is inserted in the groove along with the fastener, the deformable section is squeezed towards the first groove wall, causing the first biting projection to engage the surface of the panel while the second biting projection engages the sidewall of the groove.

15 Claims, 6 Drawing Figures

PANEL EDGE FASTENER CLIP

The present invention pertains to the field of fasteners for joining structural members of cabinets or similar structures.

Conventional construction methods for assembling structural members of furniture cabinets or similar structures include such operations as pegging, gluing, nailing, fastening with screws, etc. These may require additional finishing operations. Furthermore, where the materials to be joined include relatively thin plywood, these methods may result in damage (such as splitting) of the material. These methods thus may be relatively time-consuming and require skilled labor causing the cost of assembling to be relatively high.

In addition to the aforementioned conventional construction methods, wood or plastic construction methods utilizing other fastening devices are known. For example, the use of certain types of splines is described in U.S. Pat. No. 3,760,547 entitled, "Spline and Seat Connector Assemblies" issued to J. H. Brenneman on July 2, 1971.

In the television industry, prefabricated portions of cabinets are often shipped to the electronics chassis manufacturing facility in "knock-down" form where they are assembled and combined with an electronic chassis to form a finished television unit. In this type of manufacturing operation, it is desirable to utilize simple, effective and inexpensive construction techniques.

In accordance with the present invention, a fastener is provided comprising a generally planar body portion including at least one deformable section generally directed at an acute angle to the body portion away from the body portion and flexibly affixed to the body portion to oppose motion toward the body portion. Each deformable section includes at least a first biting projection extending in a direction generally away from the body portion. Each deformable section also includes at least a second biting projection extending in a direction generally toward the body portion.

In accordance with another feature of the present invention, at least one of the above described fasteners are utilized to hold a panel member and a receiving member together. An edge of the panel member is inserted in a groove of a receiving member so that the fastener is located between the one surface of the edge and the adjacent sidewall of the groove. The width of the edge of the panel member is such that the first biting projection engages the surface of the edge while the second biting projection is urged into engagement with the adjacent sidewall.

In accordance with still another feature of the present invention, a fastener comprising a body member having two generally planar sides and a web connecting the sides to form, in cross-section, a generally U-shaped configuration is provided. Each of the sides includes at least one deformable section which is generally directed at an angle toward the other of the sides and is flexibly affixed to said body member to oppose motion away from the other side in a resilient manner. Each section includes at least a first biting projection which extends in a direction generally toward the opposite side and also toward the web. Each section also includes at least a second biting projection which extends in a direction generally away from the opposite side.

In accordance with still another feature of the present invention the U-shaped fastener is utilized to hold a panel member and a receiving member together. In this arrangement, the U-shaped fastener is inserted in a groove of the receiving member. An edge of the panel member is inserted in the groove so that in cross-section the fastener is located between the edge and the sidewalls of the groove. The width of the edge of the panel member is such that the first biting projections engage the surfaces of the edge while the second biting projections are urged into engagement with the sidewalls of the groove.

These and other features of the present invention may best be understood by reference to the following detailed description and accompanying drawing in which.

In the following detailed description it will be helpful to refer to FIGS. 1–4 concurrently. The same reference numerals appearing in more than one figure refer to the same element.

Figure 1:
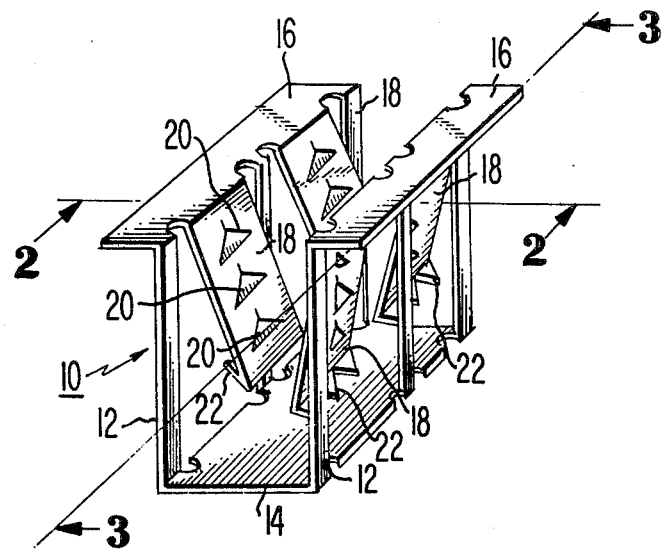
FIG. 1 is an isometric view of a fastener constructed in accordance with the present invention.
Figure 2:
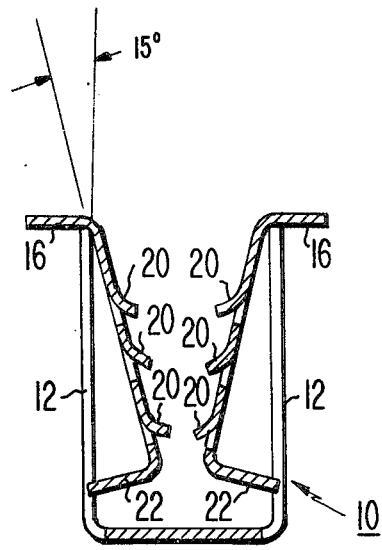
FIG. 2 is a cross-sectional view of the fastener taken in the direction of section line 2—2 of FIG. 1.
Figure 3:
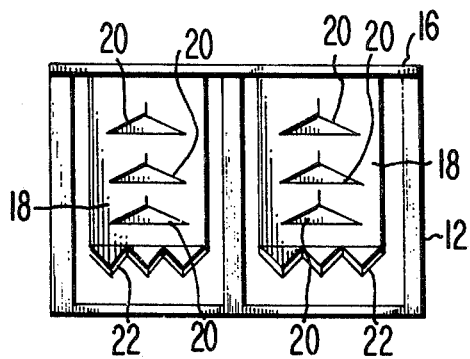
FIG. 3 is a side view of the fastener taken in the direction of section line 3—3 of FIG. 1.

Referring now to FIGS. 1–4 a fastener 10 includes two generally parallel planar sides or body portions 12 and a connecting web portion 14 which form, in cross-section, a generally U-shaped configuration. At the open end of fastener 10 flanges 16 extend outwardly from sides 12 in opposite directions and in generally perpendicular relationship thereto. As illustrated, each of the sides 12 includes two deformable sections 18 which are flexibly attached to an associated side 12 near the open end of fastener 10. Sections 18 are pivotable about an axis (shown as the intersection of flange 16 and section 18) which lies within the side and which is generally parallel to flanges 16. Each section 18 is generally directed toward the opposite side (i.e. inwardly toward the area between the sides) so that the plane of each section 18 and its associated side 12 form, in cross-section, an acute angle (see FIG. 2).

Fastener 10 is formed, for example, from a blank (see FIG. 4) cut from a suitable sheet material, such as heat treated spring steel, which has resilient characteristics selected such that deformable sections 18 will oppose a force urging them towards planar alignment with their associated sides. Heat treated spring steel having a thickness of 0.025 inches has been found suitable for this purpose.

Each of the sections 18 includes two sets of biting projections. A first set of biting projections comprises louver-like members or barbs 20 directed generally toward the opposing side 12 and also toward web portion 14. The louver-like members are formed by cutting slits in sections 16 and pushing portions of the sections near the slits outward. The second set of biting projections comprises a flange 22 having a serrated or saw-cut edge. Flange 22 is generally perpendicular to the section 18 to which it is affixed and is directed away from the opposite side 12.

Figure 4:
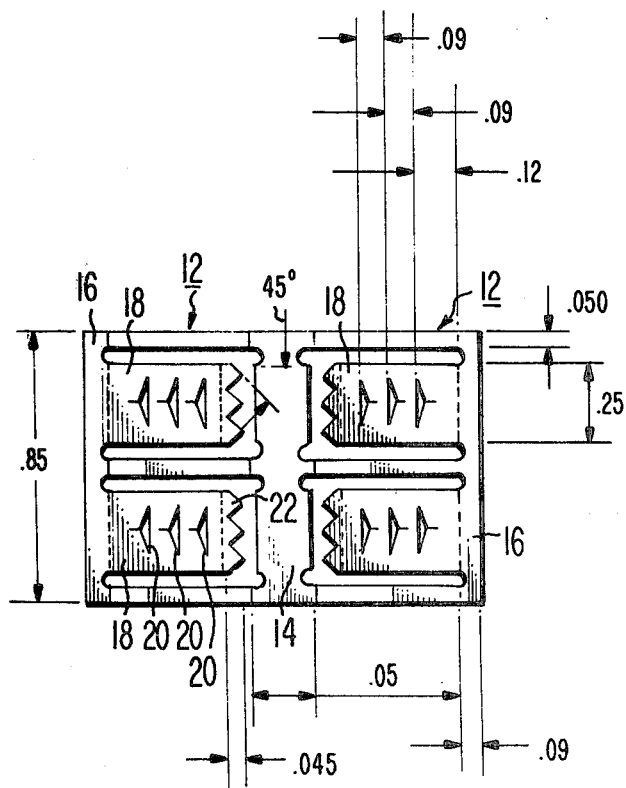
FIG. 4 is a plan view of a blank from which the fastener of FIG. 1 is formed.

A blank from which fastener 10 may be formed is shown in FIG. 4. The dotted lines in FIG. 4 indicate where the blank should be folded to form the arrangement of FIG. 1. Typical dimensions, in inches, for various portions of fastener 10 are shown in FIG. 4. The dimension labeled "A" is left open to indicate that this dimension is chosen to accomodate the dimensions of the structural members which fastener 10 joins as will be subsequently described.

While fastener 10 has been described with reference to a specific embodiment, shown in FIG. 1–4, it should be appreciated that modifications may be made to fastener 10 which fall within the scope of the present invention. For example, although web portion 14 is shown as being flat, it may be curved or assume any other suitable geometry. Furthermore, although flange 22 is shown as including serrated edges, the serrated edge may be omitted so that the biting projection of flange 22 is flat.

Figure 5A:
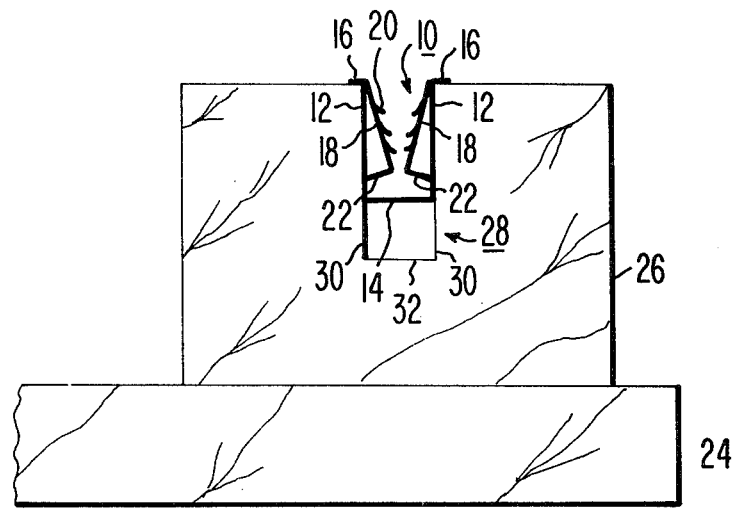
FIGS. 5a and 5b are cross-sectional views showing the manner in which a receiving member and a panel member are joined by the fastener shown in FIG. 1.
Figure 5B:
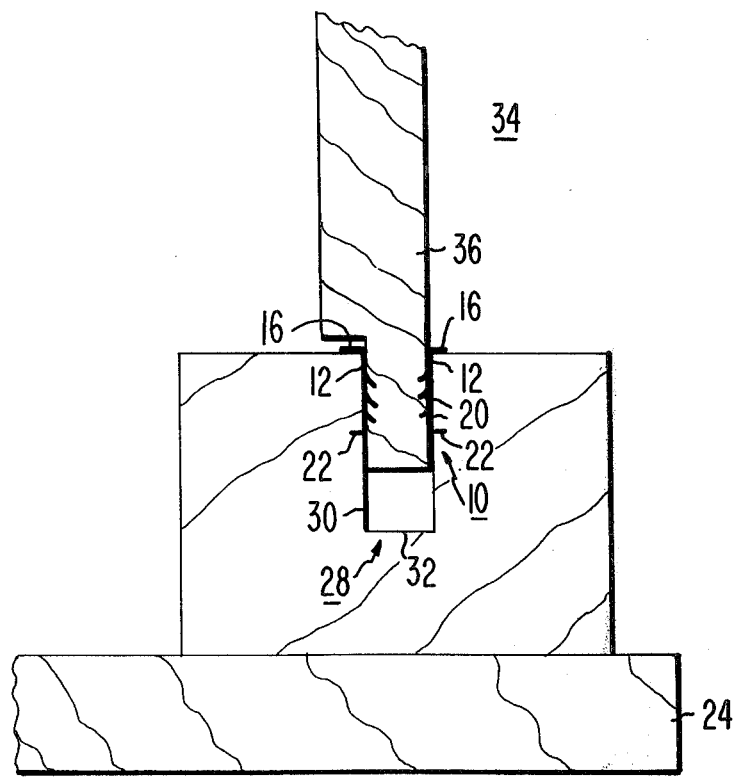

The use of fastener 10 to join structural members of a furniture cabinet or the like may best be understood by reference to FIGS. 5a and 5b. FIG. 5a shows, in cross-section, the arrangement of a receiving member such as a wooden cleat 26 and a fastener 10. Attached to receiving member 26 is a finished exterior panel 24, such as a top or the like of a cabinet. Receiving member 26 includes a groove 28 having generally parallel sidewalls 30 and an innermost well or bottom 32. Fastener 10 is inserted in the groove so that its open end faces in the same direction as the open end of the groove. The width of web 14 (dimension A of FIG. 4) is selected so that sides 12 of fastener 10 abut sidewalls 30 of groove 28 while flanges 16 support the fastener 10 at the outer surface of receiving member 26.

FIG. 5b shows, in cross-section, the arrangement of receiving member 26, fastener 10 and a panel member 34 to form a structural joint assembly. Panel member 34 has an edge 36 which is inserted into fastener 10 so that, in cross-section, the fastener 10 is fitted between edge 36 and the sidewalls 30 of groove 28. The thickness of edge 36 is such that when it is inserted into fastener 10, deformable sections 18 of fastener 10 are forced apart into substantial alignment with sides 12, thereby urging biting projections 22 to engage the sidewalls of the groove 28. At the same time, barbs 20 engage edge 36. Since barbs 20 are directed toward edge 36 and in a generally downward direction, any force tending to remove edge 36 from fastener 10 will be opposed. Similarly, engagement of biting projections 22 with sidewalls 30 of groove 28 inhibit the movement of fastener 10 from groove 28. Receiving member 26 and panel member 34 are formed from material such as wood, plastic or the like so that biting projections 20 and 22 can effectively engage them. Thus, fastener 10 is a single element interlocking arrangement for joining panel member 36 and receiving member 26 by the simple operation of inserting panel member 34 into receiving member 26.

It is noted that in the illustrated arrangement, web 14 does not come in contact with the bottom 32 of the groove 28 because flanges 16 rest on the top surface of member 26. This feature is particularly desirable since the height of fastener 10 controls the depth of insertion of panel member 34 into groove 28 and therefore allows for a relaxation of the tolerance of the depth of groove 28.

Although no additional fastening equipment or steps are required, it will be appreciated that the bond between the panel member and the receiving member can be made even more secure by such methods as applying glue between the mating surfaces of edge 36 and receiving member 26. Furthermore, is should be appreciated that although no additional structural or joining elements are required, if internal structures to the cabinet including panel member 34 and receiving member 26 are connected to them, the joint assembly will be made even more secure. Thus, if the arrangement shown in FIG. 5 forms one portion of a television receiver cabinet, for example, an electrical chassis placed within the cabinet and affixed to both receiving member 26 and panel member 34 will make the joint even more secure.

It should also be appreciated that certain aspects of the arrangement shown in the figures may be achieved utilizing a portion of the illustrated arrangement. For example, a fastener may be formed by cutting the web portion 14 at its midpoint thereby providing a half-fastener which would be associated with only one sidewall of a receiving groove and one side of an inserted panel. In certain instances, it may also be possible to entirely eliminate the web 14 and the flange 16, thereby permitting simplified forming and subsequent storage of the fastener in long strip form.

These and other modifications are considered to be within the scope of the present invention.

What is claimed is:

1. A fastener, comprising:
    a generally planar body portion;
    at least one deformable section flexibly affixed to said body portion and generally directed away from said body portion, said deformable section forming in cross-section an acute angle with said body portion;
    each deformable section including at least a first biting projection extending in a direction generally away from said body portion; and
    each deformable section including at least a second biting projection extending in a direction generally toward said body portion.

2. The fastener recited in claim 1 wherein a flange is attached to one end of said body portion.

3. The fastener recited in claim 2 wherein said flange is attached to said body portion in generally perpendicular relationship thereto.

4. The fastener recited in claim 3 wherein a web portion is attached to the other end of said body portion in generally perpendicular relationship thereto.

5. The fastener recited in claim 1 wherein each of said deformable sections may be pivoted about an axis lying within said body portion.

6. A joint assembly, comprising:
    a receiving member including a groove having generally parallel sidewalls;
    a fastener including at least one generally planar body portion arranged to abut one of said sidewalls of said groove, said body portion including at least one deformable section generally directed at an acute angle to said body portion toward the other of said sidewalls of said groove and flexibly affixed to said body portion to oppose motion toward said body portion, each of said deformable sections including at least a first biting projection extending in a direction generally away from said body portion and toward the opposite sidewall of said groove, each of said deformable sections also including at least a second biting projection extending in the direction generally away from the first biting projection;
    said fastener being inserted in said groove adjacent with one of said sidewalls;

a panel member having an edge inserted in said groove so that said fastener is located between said edge and said one of said sidewalls of said groove, said edge having a width such that the first biting projection of each of said deformable sections engages said edge and the second biting projection of each of said deformable sections engages said one of said sidewalls.

7. The joint assembly recited in claim 6 wherein a flange is attached to one end of said body portion in generally perpendicular relationship to said body portion and directed away from said groove; and a web portion is attached to the other end of said body portion in generally perpendicular relationship to said body portion and directed into said groove, said flange and said web portion defining the depth of insertion of said edge into said groove.

8. A fastener, comprising:
a body having two generally planar sides and a web connecting said sides to form, in cross-section, a generally U-shaped configuration;
each of said sides including at least one deformable section generally directed toward the other of said sides and flexibly affixed to said body to oppose motion away from the other of said sides in a resilient manner;
each deformable section including at least a first biting projection extending in a direction generally toward the opposite side and said web; and
each section including at least a second biting projection extending in a direction generally away from the opposite side.

9. The fastener recited in claim 8 wherein flanges are attached to said side portions at the open end of said body member in generally perpendicular relationship to said side portions and extending in opposite directions away from each other.

10. The fastener recited in claim 9 wherein each said deformable section may be pivoted about an axis lying in the side associated with said deformable section near the open end of said body and substantially parallel to the plane of said flanges, said deformable section being normally directed toward the opposite side to form, in cross-section, an acute angle with its associated side.

11. The fastener recited in claim 10 wherein said first biting projections are louver-like members directed generally toward said web.

12. The fastener recited in claim 11 wherein said second biting projection includes a second flange generally perpendicular to said section.

13. The fastener recited in claim 12 wherein said second flange includes a serrated edge.

14. A joint assembly, comprising:
a receiving member including a groove having generally parallel sidewalls;
a fastener including a body having two generally parallel sides spaced apart to abut said sidewalls of said groove and a web connecting said sides to form, in cross-section, a generally U-shaped configuration having an opening at one end, each of said sides including at least one deformable section generally directed toward the other of said sides and flexibly affixed to said body to oppose motion away from the other of said sides, each of said deformable sections including at least a first biting projection extending in a direction generally toward the opposite side and said web, each of said deformable sections also including at least a second biting projection extending in a direction away from the opposite side;
said fastener being inserted in said groove with the open end of said fastener being in the same direction as the open end of said groove;
a panel member having an edge inserted in said groove so that, in cross-section, said fastener is located between said edge and the sidewalls of said groove, said edge having a width such that the first biting projection of each of said deformable sections engages said edge and the second biting projection of each of said deformable sections engages said sidewalls.

15. The fastener recited in claim 14 wherein a flange is attached to each of said sides at the open end of said body, in generally perpendicular relationship to said sides, and extending in opposite directions away from each other.

* * * * *